United States Patent [19]

Chazal et al.

[11] Patent Number: 4,779,758
[45] Date of Patent: Oct. 25, 1988

[54] CARDBOARD CONTAINER WITH REINFORCING SLITS LINED WITH SYNTHETIC MATERIAL

[75] Inventors: Guy A. Chazal, Sannois; Jean A. Bodet, Versailles, both of France

[73] Assignee: Societe Parisienne d'Impression et de Cartonrage, Colombes, France

[21] Appl. No.: 406,556

[22] Filed: Aug. 9, 1982

[30] Foreign Application Priority Data

Aug. 17, 1981 [FR] France .................. 81 15794

[51] Int. Cl.$^4$ .................. B65D 5/20; B65D 5/56
[52] U.S. Cl. .................. 220/462; 206/557; 220/415; 229/2.5 R; 229/110; 229/119; 229/125.35
[58] Field of Search .............. 220/460, 461, 462, 458, 220/441, 443, 415; 229/41 C, 41 D, 2.5 R, 3.5 MF, 119, 125.35, 110; 206/519, 557

[56] References Cited

U.S. PATENT DOCUMENTS

| | | | |
|---|---|---|---|
| 2,886,828 | 5/1959 | Lattuca | 206/557 X |
| 3,135,455 | 6/1964 | Santangelo | 229/43 X |
| 3,236,403 | 2/1966 | Steinbers | 229/2.5 R X |
| 3,253,762 | 5/1966 | Gaunt | 229/2.5 R |
| 3,420,431 | 1/1969 | Donovan | 229/2.5 R |
| 3,468,468 | 9/1969 | Foote | 220/453 |
| 3,489,331 | 1/1970 | Andersson | 220/468 X |
| 3,580,413 | 5/1971 | Quackenbush | 229/75 R X |
| 3,654,076 | 4/1972 | Hatch | 206/520 X |
| 3,756,495 | 9/1973 | Bemiss | 206/519 X |
| 3,863,832 | 2/1975 | Gordon et al. | 229/43 |
| 3,866,816 | 2/1975 | Bemiss | 220/462 |
| 4,026,458 | 5/1977 | Morris et al. | 229/2.5 R X |
| 4,337,116 | 6/1982 | Foster et al. | 229/2.5 R X |
| 4,349,124 | 9/1982 | Faller | 229/2.5 R X |

FOREIGN PATENT DOCUMENTS

| | | | |
|---|---|---|---|
| 1356099 | 2/1964 | France | 493/363 |
| 1363765 | 8/1974 | United Kingdom | 229/2.5 R |

*Primary Examiner*—Allan N. Shoap
*Attorney, Agent, or Firm*—Kane, Dalsimer, Sullivan, Kurucz, Levy, Eisele and Richard

[57] ABSTRACT

In a cardboard container, having a bottom wall and side walls, slits are defined to extend only in the bottom wall and the material of the bottom wall is deformed or bent so that the portions of the bottom wall, adjacent to the edges of each given slit, are situated different planes and are maintained in these different planes by means of a sheet of synthetic material. The sheet of synthetic material is shaped by heat deformation to conform with the deformed shape of the bottom wall.

12 Claims, 3 Drawing Sheets

CARDBOARD CONTAINER WITH REINFORCING SLITS LINED WITH SYNTHETIC MATERIAL

BACKGROUND OF THE INVENTION

Containers have long been known which are composed of a cardboard portion and a portion of synthetic material, interconnected closely for obtaining both the advantages of cardboard and of those of the synthetic material.

The cardboard portion is formed of a grooved and cut blank which contains the different container elements, i.e. a bottom, walls and possibly a flat edge.

The plate, cut and grooved in this manner, is put in a mold, and on top of it a sheet of stretched synthetic material is placed which is thereupon thermo-formed according to a known method.

When the operation of thermo-forming is over, the finished package is kept in shape by the fact that the synthetic material adheres to the entire interior surface of the container and thus stays in place with respect to all portions of the container, just as desired.

Such a container can have all kinds of printing on it because the blank is printed upon when flat, prior to cutting and grooving. At the same time the interior faces of the cardboard are protected by a thermo-formed sheet of synthetic material against substances which would be damaging to the cardboard, such as liquids, vegetable or animal fats, etc.

Moreover, if the container has a flat edge, it is covered by a sheet of thermo-formed synthetic material. It is thus possible to close the container by means of a heat-sealed lid on the edge, in such a way that a tight container is attained which is especially adapted for packaging food products.

Experience shows that such a container has certain limitations with respect to size, especially when the bottom must be flat because twisting and warping of the entire container occur which give it a mediocre appearance and which can even have practical consequences by creating a strain on the sealing of the cover or by giving the container an undesirable instability when laid out in the show windows of stores, for example.

A well known problem for packaging products consists in providing interior separations either to maintain or arrange in a fixed position solid objects (ampules for pharmaceutical products, for example), or to insulate products which should not be mixed (liquids, foods with different tastes and the like).

A solution of this problem has been described in our U.S. patent application Ser. No. 246,706, continuation of part of our U.S. patent application Ser. No. 837,282 now abandoned. It consists in providing openings in a cardboard blank so that the relief portions of the mold for thermo-forming can traverse the blank without deforming it and can constitute the forms on which the sheet of synthetic material is applied without getting attached thereto. In practice, the relief portions thus created are formed only of synthetic material and the thickness of the sheet is chosen in such a way that it is sufficiently solid for the purpose.

To allow, on the one hand, utilizing the best qualities of cardboard and, on the other hand, the qualities of synthetic materials, it has already been considered to arrange cardboard in two parallel and spaced planes (with the edges and the bottom having small cavities), whereas the walls which are substantially perpendicular to these planes, are all of synthetic material. A container of this type is described in French Patent No. 79/12.155 of May 14, 1979.

SUMMARY OF THE INVENTION

The present invention obviates the shortcomings of the known containers, increases their usefulness, and allows the creation of new container types which are shaped in relief inside, thus creating different useful arrangements for holding and conserving various food products which are delicate, such as ground meat, milk products etc.

A container according to the invention is of the type comprising a cardboard portion which forms a bottom, walls and possibly a plane edge and a portion of synthetic material, closely interconnected, so that the cardboard portion is completely covered inside by the portion of synthetic material which holds the various elements of the cardboard portion together and is characterized in that the element of the cardboard portion which constitutes the bottom of the container has slits by means of which the edges are bent by deforming the cardboard and are fixed by the synthetic material.

BRIEF DESCRIPTION OF THE DRAWING

Other features of the invention will appear in the following detailed description in which reference is made to the attached drawing. It is to be noted that the description and drawing are not exclusive but give only examples.

DETAILED DESCRIPTION

Figure 1:
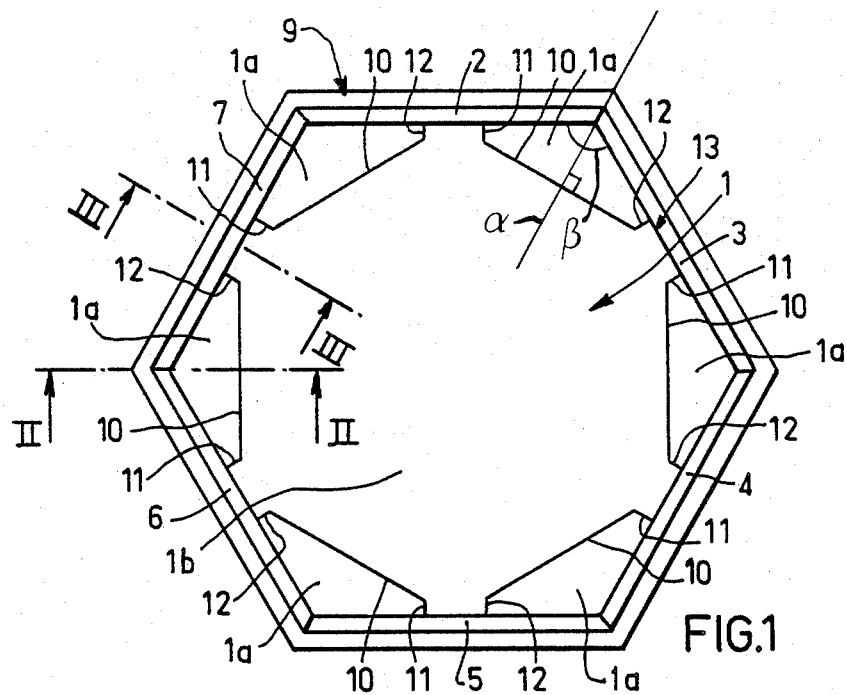
FIG. 1 is a plan view of a container according to the invention, showing a first embodiment thereof.
Figure 2:
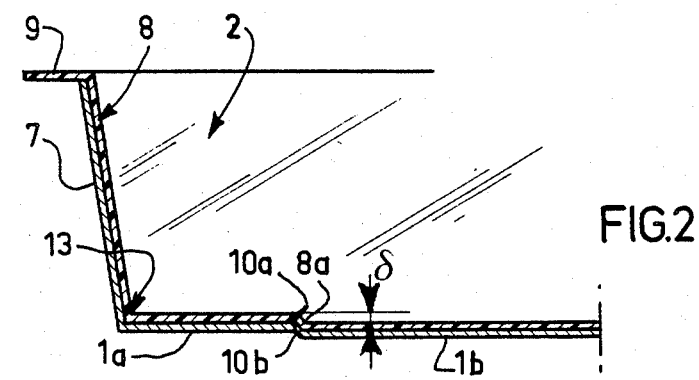
FIGS. 2 and 3 are partial, schematic views in section along the lines II—II and III—III, respectively, of FIG. 1.
Figure 3:
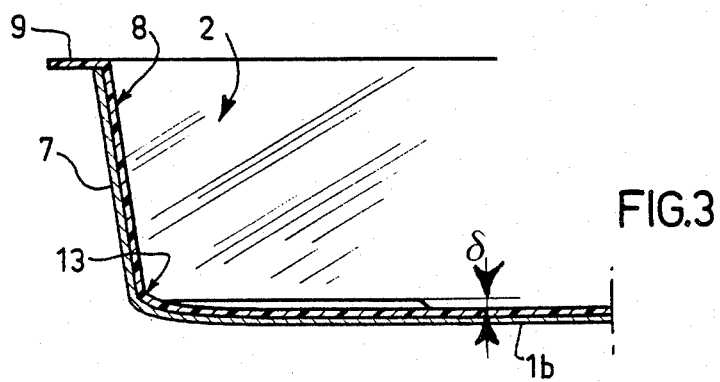
Figure 4:
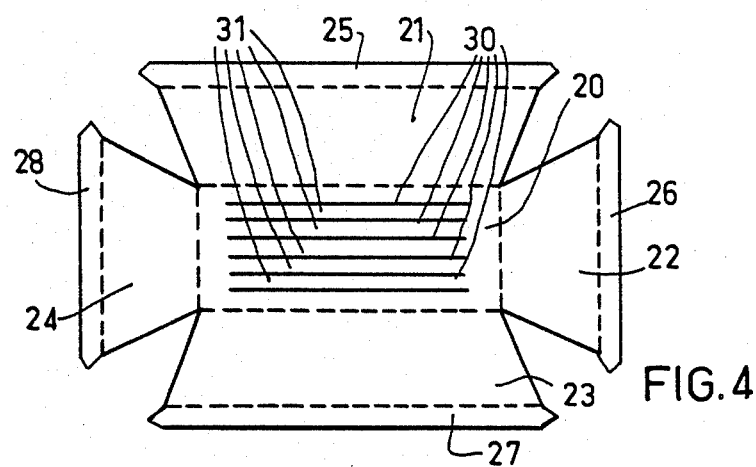
FIG. 4 is a view of a cut, grooved and slit cardboard blank according to another embodiment of the invention.

Referring to FIGS. 1 to 3 of the drawing, a first embodiment of the improved container is seen there which comprises a hexagonal bottom 1 and six trapezoidal walls 2 to 7.

When the walls are set with respect to the bottom 1, they form among each other an angle of 60°, and they are maintained there, as is known per se, by a thermo-formed sheet of plastic material 8 which in this case forms also a flat edge 9.

According to the invention, the cardboard bottom 1 has slits 10 opposite each angle formed by the walls among themselves. This means that the bottom 1 has as many slits 10 as it has angles, and each slit 10 extends perpendicularly to the apparent bisecting plane α of the considered angle β.

In addition, each slit 10 is extended at both ends by the slits 11 and 12 which lead up to the circumference 13, with the latter being formed by a groove line with which the walls 2 to 7 are connected to the bottom 1.

The lips (or edges) 10a and 10b of each slit 10 are bent out by deformation of the cardboard which forms the bottom 1, and are fixed by the sheet of synthetic material 8.

For this purpose, when the cut and grooved cardboard blank is placed in a mold for thermo-forming with the sheet of synthetic material, the bottom of the mold has portions in relief opposite the portions of the bottom 1 which are positioned between the slits 10, 11 and 12 on the one hand and the circumference 13 on the other hand, in such a way that at the moment when the sheet of synthetic material reaches the bottom 1 by heat deformation and under the effect of air pressure, it forces the central portion of the bottom 1 to be applied against the bottom of the mold which is positioned lower than its relief portions.

Therefore, each portion 1a of the bottom 1 which is positioned between the slits 10, 11 and 12 on the one hand and the circumference 13 on the other hand, lies in the theoretical plane which the bottom 1 normally has, whereas the portion 1b of the bottom 1 which is positioned in the center, is deformed to place itself below said theoretical plane at a distance δ.

These arrangements are particularly well shown in FIGS. 2 and 3.

It can thus be seen that opposite each slit 10 there is a portion 8a of the sheet of plastic material which extends practically perpendicularly to the plane of the bottom and forms a kind of reinforcement rib which obviates twisting or warping of the bottom.

The distance δ can, in practice, be very small so that the cardboard is deformed by extension of its fibers opposite the bottom, and that deformation is not transferred to the walls of the container which remains completely in the geometric form it has been given.

The slits 11 and 12 allow a greater play of the lips 10a and 10b of the slit 10 without creating the beginning of a breaking, and by giving more leeway to the extension of the cardboard fibers.

A container which is made in this manner can be stored for a long time before being filled and covered without undergoing any noticeable deformation. When the containers are then picked up by automatic machines to be filled and covered, and in case the inside is put under a vacuum, no accident need be feared due to an unreliable positioning of the contents, especially in regard to its height. This is contrary to what might happen with warped containers.

It is noted that the invention provides a stability of shape of the containers without relying on any additional means of cardboard or synthetic material. This differs from the solution known up to now which consists in providing an edge 9 which has considerable thickness. It is to be noted that such excessive thickness requires an additional use of synthetic material and, finally, gives only unsatisfactory results.

According to another embodiment of the invention, the bottom of the container has at least two parallel slits which define at least one band.

This band can have an overall deformation to attain the necessary feature of the invention, according to which the edges of each slit are oppositely bent out.

But according to a modification the band is deformed according to a plurality of longitudinal relief portions which are spaced from each other.

Figure 8:
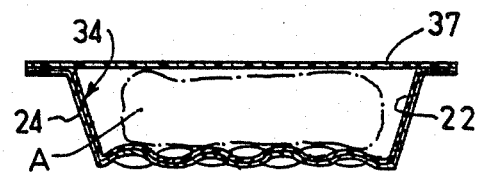
FIG. 8 is a schematic longitudinal section of a container according to the invention which is covered and contains packaged or wrapped products.
Figure 9:
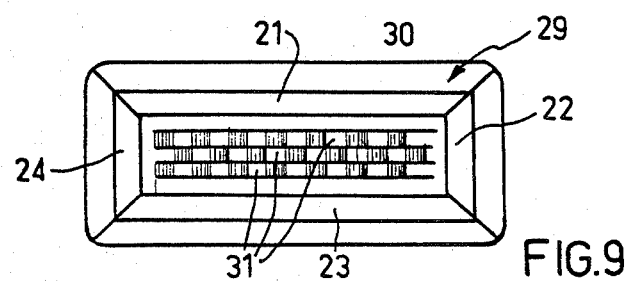
FIG. 9 is a plan view of the same container as the one shown in FIG. 8, but prior to being filled and covered.
Figure 10:
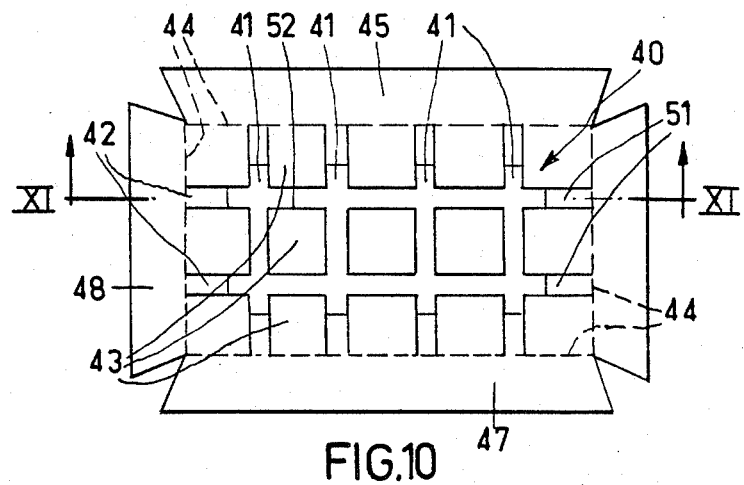
FIG. 10 is a view of a cut, grooved and slit cardboard blank according to another embodiment of the invention.

Referring to FIGS. 4 to 9, an embodiment of the invention can be seen there according to which a container is obtained from a grooved and cut cardboard blank to have a rectangular bottom 20 and four trapezoidal walls 21, 22, 23 and 24 ending in the respective segments 25, 26, 27 and 28 for forming by juxtaposition, rim to rim, a flat edge which is referenced by the general numeral 29 in FIG. 9.

The bottom 20 has parallel slits 30 to define the bands 31.

The cut and grooved blank is placed into a mold 32 of known type, and for facilitating the transfer, one can provide "bridges" on the slits 30 between the bands 31 to avoid their deformation outside of the plane of the blank.

The blank is formed in the mold 32 by any known means, and the bands 31 receive the overall shape of an arc of a circle on the relief portions 33 provided on the bottom of the mold.

A sheet 34 of thermo-formable material is stretched onto the suitably arranged cardboard blank. Then the mold 32 is closed by means of a "lid" 35, which step is followed by heated and compressed air being blown in above the sheet 34 so that it can be deformed in a manner known per se.

Here the various parameters of operation are established, such as to temperature, air pressure, thickness of the sheet 34 etc. so that said sheet 34 can efficiently push upon the bands 31 so that they assume the upper form of the relief portions 33. This is made easier by a depression created in the channels 36, known per se, and provided in the bottom of the mold 32.

The bending out of the edges of the slits 30 is obtained due to the fact that the relief portions 33 are staggered from one band 31 to another.

It can be noted that the relief portions 33 have the shape of ridges with steeply sloping sides, giving to each band 31 an undulated profile.

Figures 5, 6:
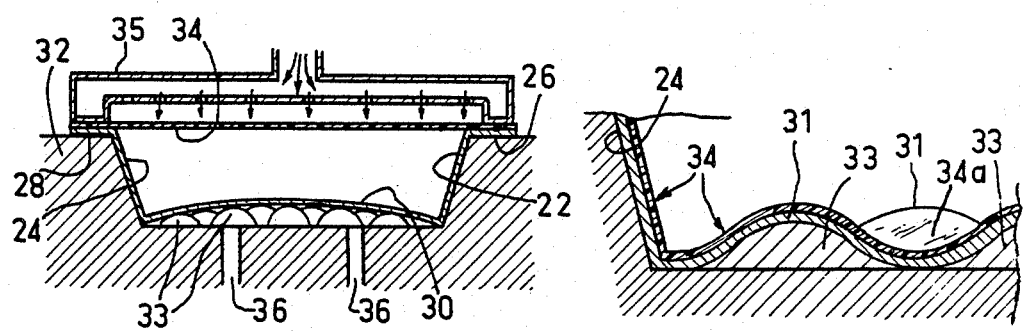
FIG. 5 is a schematic view showing how a blank of FIG. 4 is placed into a mold for thermo-forming with a sheet of synthetic material.
FIG. 6 is a partial, schematic view showing at a larger scale the formation in relief obtained by deforming the cardboard.
Figure 7:
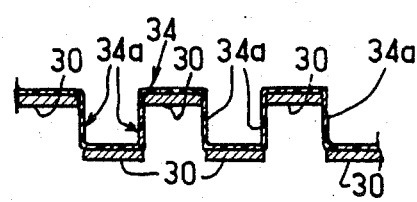
FIG. 7 is a schematic view showing in cross section how the bent-out edges of the slits in the bottom of the container are kept in place by the synthetic material.

This arrangement is especially visible in FIG. 6 where it is shown that the bands 31 are all undulated, but the steep ridges are staggered from one band to another in such a way that the shseet 34 of synthetic material has faces 34a which are substantially perpendicular to the theoretical plane of the bottom. The same applies to the arrangement shown in FIG. 7.

The bulged shape of the relief portions 33 allows the cardboard to be deformed "softly" by extension of its fibers, thus creating a large number of relief portions and depressions.

The effect thereof is the formation of ridges on the bottom 20, thus obtaining a container which can practically not be deformed. All this is achieved without the use of additional material, as has been set forth above.

But such a bottom is also especially well adapted to hold certain food products, like ground meat, for example, due to the fact that air moves easily across the entire surface while the product is kept in place by a large number of support points.

For these arrangements it is advantageous to choose a micro-porous material for the thermo-formable sheet 34 of synthetic material.

As a matter of fact, the deformation of the bands 31 and the keeping up of their staggered edges allows to create a communication with the outside of the container, opposite the portions 34a of the sheet 34 because no cardboard is there.

It is therefore possible to easily package certain fresh milk products, for example.

It should be understood that a synthetic material functioning as a barrier, can be chosen if it is desired to provide a completely tight package.

It is obvious that in this case the container can have a cover such as the one indicated by numeral 37 in FIG. 8, which figure also shows a product A lying on the tops of the cardboard undulations covered by synthetic material.

The solid attachment of the sheet 34 of synthetic material after thermo-forming assures the keeping in place of the deformed bands 31 and the relief portions in form of steep ridges which result in a reliable, solid state since a push from above is distributed according to the well-known principle of the vault.

Turning now to FIGS. 10 to 13, another embodiment of the invention can be seen according to which the bottom 4 comprises crossed bands 41 and 42.

According to the example shown, the bands 41 and 42 form between each other polygons 43, situated on a different level $\mu$ of their $v$ to constitute hollow portions inside the vertical sides of each polygon 43.

The bands 41 and the bands 42 cross at a right angle and form a network on two levels $\mu$ and $v$, interconnected by the inclined planes 49 at the periphery of the bottom 40, i.e. at the grooved lines 44 which separate the bottom 40 from the walls 45, 46, 47 and 48 of the container.

Figure 11:
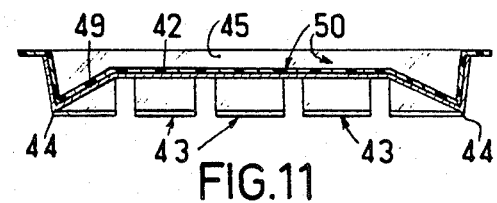
FIG. 11 is a schematic, sectional view of a container which is formed of a blank according to FIG. 10.
Figure 12:
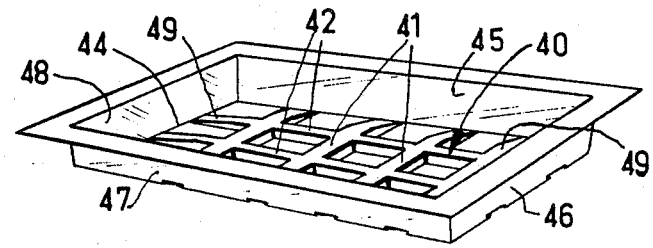
FIGS. 12 and 13 are shcematic, perspective views showing the inside and the outside of a container according to FIG. 11.
Figure 13:
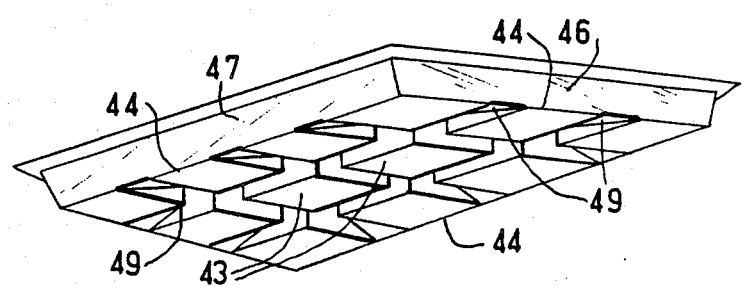

FIG. 11 shows that each band 41 and each band 42 is plane and raised with respect to the plane $v$ in which the bands extend when they have not been deformed "upwardly", whereas the squares 43 are on the level $\mu$ which would be the bottom of a container of the known type.

The inclined planes 49 can be rectilinear as those shown or they can be curved. In both cases they assure the progressiveness of the staggering between the levels $\mu$ of the squares 43 and $v$ of the bands 41 and 42.

So that the squares 43 remain solidly connected with the bands 41 and 42 up to thermo-forming of a sheet 50 of synthetic material, the slits 51 which define the bands 41 and 42 are interrupted on very short distances to form bridges 52. This is known per se. The number and the disposition of these bridges is left to the appreciation of a person skilled in the art who knows how to carry out this process as a function of the quality of the cardboard, the dimension of the polygons, the size of the bands etc.

The cardboard blank can be of a kind which allows easy removal from a supply pile to the mold for thermo-forming. It is put into the mold by any known means and then either straightened out by a punch or by the sheet 50 itself.

It is at the time of this operation that the bridges 52 yield and cause the separation of the polygons 43 at the center which are placed directly against the bottom of the mold as well as the base of the walls 45 to 48, i.e. the grooved lines 44.

Not all the sides of the polygons 43 of the periphery are defined by the slits 51, because one of these sides is formed by a line 44. These polygons consequently remain integral with the walls, and, through them, the adjacent bands.

In the example shown, the bands 41 and 42 are in relief and the polygons 43 are cavities. Each of them can therefore hold an object. The network can also form a support as has been explained in connection with FIGS. 4 to 9.

Contrary to what has been shown, it is possible to provide bands as cavities and the polygons in relief, either for the purpose of solid packaging (the bands serve as seats), or for the purpose of support.

It is to be noted that the angle at which the bands cross can be other than 90° when a geometry of lozenges, hexagons etc. is desired.

According to the relative dimensions of the bands and the polygons they determine and according to the amount of staggering which has been established between the edges of one and the same slit, a regular division into compartments (FIGS. 10 to 13), a network of supporting points (FIGS. 4 to 9) or only anti-warping ribs (FIGS. 1 to 3) is obtained. But, of course, the anti-warping effect is attained in all the cases.

The invention can be used with all sorts of different forms for the staggered bending out of the lips of the slits formed by the cardboard and in accordance with the products to be packaged, the shape and dimension of the containers, the thickness and characteristics of the cardboard, the thickness and the properties of the sheet of synthetic material, etc.

The invention is therefore not limited to the embodiments described and shown but covers also all modifications.

We claim:

1. A container comprising a sheet of cardboard forming a bottom of said container and sidewalls connected to said bottom at the periphery thereof, slits defined through said cardboard sheet in said bottom, said sidewalls of the container forming angles between each other, the bottom having as many slits as there are angles, and each slit corresponding to a different angle and extending perpendicularly to the bisecting plane of the corresponding angle, said slits having edges extending only in said bottom, said cardboard sheet of said bottom being bent so that said edges of said slits lie in different planes, a sheet of synthetic material covering said cardboard sheet and holding said edges of said slits in said different planes.

2. A container according to claim 1, wherein each slit is extended at both ends by slits which extend to the periphery of the bottom perpendicularly to the periphery.

3. A container according to claim 1, wherein each portion of the bottom, situated between the slits and the periphery of the bottom, lies in one plane whereas the portion of the bottom situated at the center thereof, is deformed so as to be positioned below said one plane.

4. A container according to claim 1, wherein said synthetic material is micro-porous.

5. A container comprising a sheet of cardboard forming a bottom of said container and sidewalls connected to said bottom at the periphery thereof, slits defined through said cardboard sheet in said bottom, said slits having edges extending only in said bottom, the cardboard sheet of said bottom being bent so that said edges of said slits lie in different planes, a sheet of synthetic material covering said cardboard sheet and holding said edges of said slits in said different planes, wherein at least two of said slits are parallel to define at least one band and wherein said band is deformed to provide a plurality of longitudinally spaced relief portions.

6. A container according to claim 5, wherein at least three of said slits are parallel to define at least two bands which are deformed to provide staggered relief portions.

7. A container according to claim 6, wherein said relief portions are in form of ridges with steeply sloping sides which give each band an undulated profile.

8. A container according to claim 5, wherein said synthetic material is micro-porous.

9. A container comprising a sheet of cardboard forming a bottom of said container and sidewalls connected to said bottom at the periphery thereof, slits defined through said cardboard sheet in said bottom, said slits having edges extending only in said bottom, the cardboard sheet of said bottom being bent so that said edges of said slits lie in different planes, a sheet of synthetic material covering said cardboard sheet and holding said edges of said slits in said different planes, wherein at least two of said slits are parallel to define at least one band and wherein the bottom is shaped to comprise crossed bands.

10. A container according to claim 9, wherein said bands define at least one polygon situated at a level different from adjacent portions of said bottom so as to form at least one cavity.

11. A container according to claim 10, wherein the bands (41 and 42) cross at a right angle and form a network of polygon on two levels interconnected at the periphery of the bottom by inclined planes.

12. A container according to claim 9, wherein said synthetic material is micro-porous.

* * * * *